Dec. 7, 1954     E. D. HILBURN     2,696,601

MULTIPLEX TELEMETRIC SYSTEM

Filed June 8, 1948     6 Sheets-Sheet 2

FIG. 2

INVENTOR.
EARL D. HILBURN
BY *Hyman Hurwitz*
ATTORNEY

Dec. 7, 1954     E. D. HILBURN     2,696,601
MULTIPLEX TELEMETRIC SYSTEM
Filed June 8, 1948                 6 Sheets-Sheet 4

INVENTOR.
EARL D. HILBURN
BY
ATTORNEY

FIG. 6

Dec. 7, 1954  E. D. HILBURN  2,696,601
MULTIPLEX TELEMETRIC SYSTEM
Filed June 8, 1948  6 Sheets-Sheet 6

INVENTOR.
EARL D. HILBURN
BY Hyman Hurwitz
ATTORNEY

United States Patent Office 2,696,601
Patented Dec. 7, 1954

2,696,601

MULTIPLEX TELEMETRIC SYSTEM

Earl D. Hilburn, Kensington, Md., assignor to Melpar, Incorporated, Alexandria, Va., a corporation of New York Application June 8, 1948, Serial No. 31,799

17 Claims. (Cl. 340—183)

This invention relates generally to improvements in telemetric systems, and more particularly to improvements in telemetric systems for providing telemetric information from a plurality of measuring devices to a corresponding plurality of recording devices, over a multiplex communication channel.

Briefly, in systems of the above character, information from the various measuring devices may be applied to separate amplitude modulating elements of a commutating or time division multiplexing cathode ray tube, which serves to sample the readings of the measuring devices in succession, and to generate a pair of pulses, in response to each measurement, the pulses of each pair having a difference of amplitude which is proportional to the value of the measurement.

In performing the multiplexing function, sine wave signal of identical frequency and amplitude is applied to each of the measuring devices, these signals being, however, all mutually displaced in phase by a predetermined phase angle. The measuring devices modulate the signals applied thereto, by modifying the amplitude of each signal in accordance with the value of the quantity measured. The commutating cathode ray tube samples the translated signal waves, in succession, as they reach their maximum positive values, and again as they reach their maximum negative values, providing a short output pulse in response to each sampled value. The phases of the signal waves being mutually displaced, the generated pulses are similarly displaced in respect to time position.

The problem of generating a large number of sine wave signals of equal mutually displaced phase may be accomplished by various techniques, in accordance with the known prior art. These techniques have generally proven expensive and complicated in practice and have required considerable apparatus. The use to which the generating equipment may be put, however, may necessitate the use of light, simple and inexpensive apparatus. For example, I contemplate utilizing apparatus arranged in accordance with the present invention for measuring values associated with flight of expendible missiles, or aircraft, and the like, where space and weight requirements, in particular, are vital factors of design.

It is, accordingly, a feature of the invention to utilize a multiphase transformer of particularly simple character, for generating signals of fixed phase separation. I have built and successfully tested such transformers, having as many as thirty output phases, for use in systems employing my invention.

At the telemetric receiving station, received pulses are channeled to appropriate recorders by means of a trigger chain commutator, which is, in effect, a gating system, synchronized with the sampling operation at the telemetric transmittter. Synchronization of the trigger chain commutator is accomplished, in systems of the type disclosed herein, from a sync pulse of greater amplitude than the signal pulses, which is generated by the commutator or sampling tube at the transmitter, and which is alloted one channel of the plurality available for transmission of information. In accordance with the known prior art, the sync pulse has been separated from the remaining pulses by an amplitude separation filter, and applied to a ringing circuit having precisely the desired resonant frequency to provide a continuous wave having a frequency equal to the desired pulse rate, or channel interchange rate. The continuous wave is then utilized to control generation of interchannel switching pulses for the commutating chain. In systems of this character, if the commutation rate at the transmitter unit is not precisely on frequency, it results that even though the switching pulses are started at the proper instant by the sync or master pulse, as the operation of the trigger chain progresses a cumulative error develops, and the last few channels may be improperly commutated. In a thirty channel system, for example, an error of as little as two percent in the commutation frequency at the transmitter will produce errors in the de-modulated intelligence signal, and also serious cross-talk between adjacent channels.

It is, accordingly, a further feature of the invention to provide a novel channel switching system, which is maintained in synchronism with the transmitted pulses by virtue of an automatic frequency control system of novel character, the triggering channels being controlled from a local oscillator, the output of which is utilized to produce a local master pulse, the time position of the local master pulse being compared with that of the received sync pulse. If coincidence between the pulses is not maintained, a control voltage is generated which is applied to a corrective circuit which shifts the frequency of the local oscillator. The interchannel switching pulses may be derived directly from the output of the local oscillator, above referred to. Since the interchannel pulses are derived locally, there results the advantage that temporary loss of sync pulses in transmission does not cause failure of the system.

In performing the multiplexing operation, further, the sampling cathode ray tube is required to be driven in a scanning operation by a voltage having precisely twice the frequency of the signals applied to the measuring devices, to enable the sampling of maximum positive and negative values of the signals in alternation. The scanning frequency applied to the sampling tube and the signals applied to the measuring devices must be locked, in respect to both relative frequency and relative phase.

It is, accordingly, a further feature of the invention to derive measuring frequency and sampling frequency from a common source of signal, having an output at the measuring frequency, the signals applied to the sampling tube being derived by a frequency doubling process which is of such nature as to maintain the relative phases of the signals despite variations in frequency of the common source, due to variations of operating conditions.

The above and still further features and advantages of the present invention will become more evident upon study of the following detailed description of a specific embodiment of the invention, especially when taken in conjunction with the accompanying drawings, wherein.

Figure 1:
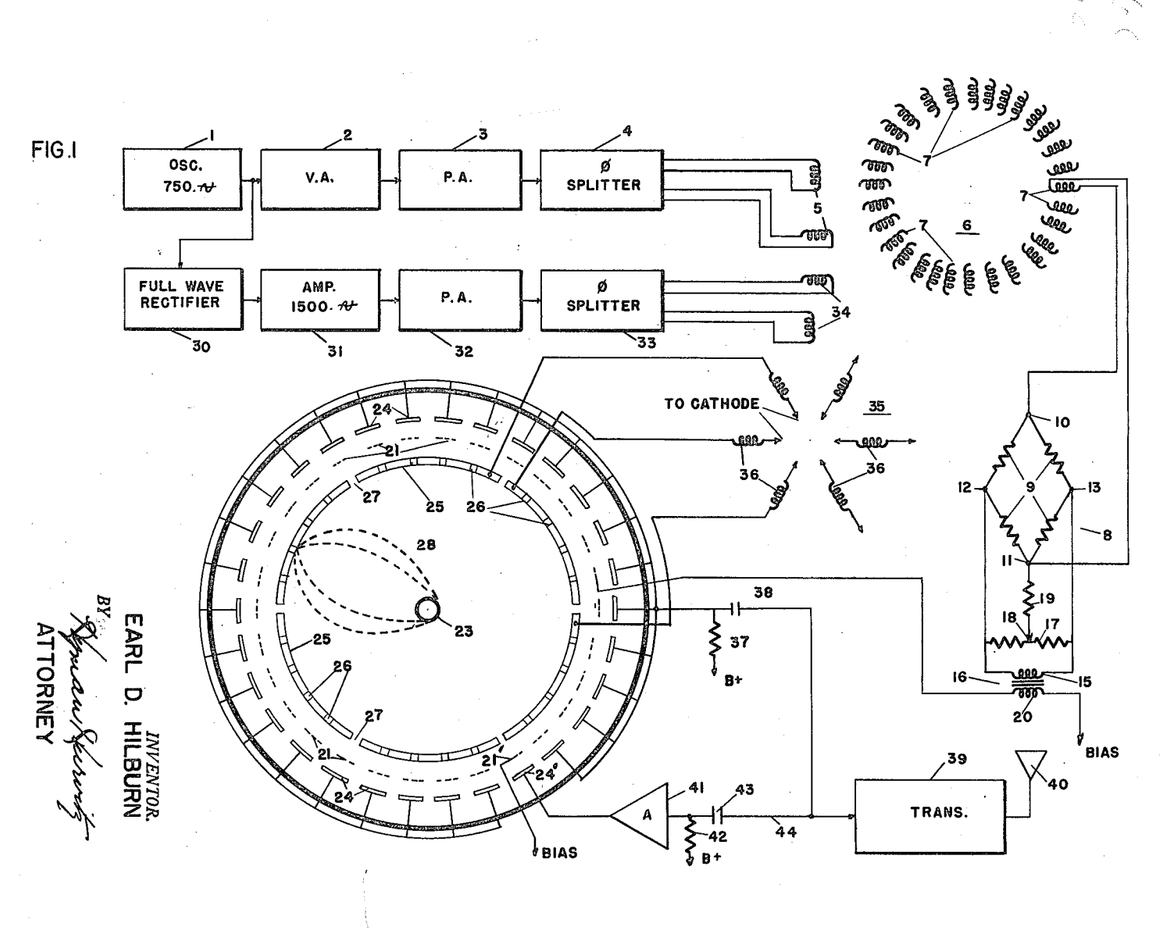
Figure 1 is a circuit diagram, partly in functional block form of a transmitter station in accordance with the invention.

Referring now to the drawings, and particularly to Figure 1 thereof, which illustrates in functional block diagram a multiplex transmitter in accordance with the invention, the reference numeral 1 represents a source of reference signal, which is frequency and amplitude stabilized, but which may be subjected to extreme variations of temperature and atmospheric pressure, as well as to extreme values of mechanical acceleration, and which consequently is subject to certain unavoidable variations of both amplitude and frequency. For purposes of example only, the frequency of the source 1 may be taken as equal to 750 cycles per second.

The output of the source 1 may be applied, via a voltage amplifying and isolating amplifier 2 to a power amplifier 3, the output of which is further applied to a phase splitter 4, the output of which, in two phases bearing a 90° relation the one to the other, is applied to crossed primary coils 5 of a transformer 6, having thirty secondary coils 7, the latter being suitably mechanically oriented and electrically designed to provide thirty distinct output voltages of equal amplitude, and of equal mutual phase displacement. The precise structure of the transformer 6 is not illustrated in the present specification, an understanding of the precise structure not being required for an understanding of the transmitting apparatus of Figure 1.

Each of the secondary coils 7 is connected to the input terminals of a guage 8, which takes the form of a resistance bridge having resistance arms 9, the coil 7 being connected across two opposite terminals 10, 11 of the bridge, and the output being derived across the remaining pair of terminals 12, 13. The bridge itself is made up of resistances, at least one of which is subject to stress, and which, when deformed, change in respect to resistance value, in proportion to strain. Consequently the guages are of the nature of strain guages, the bridge becoming unbalanced in accordance with the strain imposed upon one or more of its members 9. Potential available at the terminals 12, 13 of each guage 8 is applied to the primary 15 of a transformer 16, a variably center tapped resistance 17 being connected across the primary 15, the variable tap being connected over a resistance 19 to the terminal 11 of the guage 8. Variation of the tapping point of the variable tap 18 enables balance of the bridge included in the guage 8, to enable attainment of zero output in the absence of strain. The secondary 20 of each of the transformers 16 is connected between a source of bias voltage and one of the control grids 21 of a commutating or sampling tube 22.

In the presently described embodiment of my invention, the total number of channels available and utilized is thirty, and consequently the sampling tube 22 is constructed to have a single cathode 23, thirty grids 21, and thirty associated plates 24. The tube 22 is further provided with six deflection electrodes 25, each of which is provided with four apertures 26, each of the apertures 26 being in alignment with a grid 21 and a plate 24. Additionally, the deflection electrodes 25 are spaced angularly, by equal amounts, and are separated by slight spaces 27, which themselves effectively form six additional apertures, each of which is in alignment with a grid 21 and a plate 24. The thirty apertures, 26 and 27, and the associated grids 21 and plates 24 are spaced by equal angular displacements of 12° about the periphery of a circle drawn about the cathode 23 as a center.

The cloud of electrons 28, provided by the heated cathode 23, may be drawn in any direction radially to cause electrons to impinge upon and pass through any one of the apertures 26, 27, in accordance with the instantaneous values of potentials applied to the deflecting electrodes 25. To the deflecting electrodes 25 are applied three phase potentials, in manner to create a rotating electric field within the tube 22, and thereby to cause rotation of the beam of electrons 28, and a periodic scanning of the apertures 26 and 27 by the beam of electrons 28. The three phase deflection voltage is derived in the following manner.

The output of the source 1 is applied to a full wave rectifier 30, which, in accordance with its known properties, provides at its output a signal rich in second harmonic, and from which first and third harmonic of the frequency of the source 1 is absent. The output of the full wave rectifier is applied to a second harmonic filter, of relatively broad band characteristic, which transfers the 1500 cycle component available in the output of the rectifier 30, but which rejects any D. C. component of output and any fourth harmonic component which may be present in the output. The stage 31 does not of itself act as a frequency multiplying stage and is not sharply tuned. Accordingly, any change in frequency of the source 1 is accompanied by a corresponding change in the frequency of the output of the stage 31, but not by a change of relative phase as between the output of the source 1 and of the stage 31. As will become evident as the description proceeds, the locking of relative phase as between source 1 and stage 31 is in the highest degree essential to the successful operation of the present system, a condition which forbids utilization of conventional frequency multiplying circuits, which are sharply tuned or resonant, and which, accordingly, provide shifts of output phase in response to changes of input frequency.

The output of the tuned amplifier 31 is amplified in a broad band power amplifier 32, the output of which is applied to a phase splitter 33, the phase split output of the phase splitter 33 being applied to crossed coils 34 constituting the primary of a phase multiplying transformer 35. The coils 34, being mutually oriented at right angles physically, on the one hand, and being fed with currents in 90° phase disparity on the other hand, provide a rotating magnetic field, which, traversing the six coils 36, equally spaced in pairs angularly with respect to the crossed coils 35, induce in the coil pairs voltages which are in 120° phase relation, from pair to pair. The six coils 36 may be considered as made up of three pairs of coils, the coils of each pair being identically oriented physically but connected to provide outputs in precisely opposite phase.

The coils 36 are connected each with one end to cathode 23, and the other end to one of the deflecting electrodes 25, coils of succeeding phase being connected to physically succeeding ones of electrodes 25, and coils of a pair being connected to opposing ones of electrodes 25 to provide a continuous rotation of the resultant voltage between electrodes 25 and cathode 23 at a rate of 1500 revolutions per second.

Twenty-nine of the plates 24 of the sampling tube 22 are connected in parallel to one end of a load resistance 37, to the remaining end of which is applied suitable plate potential, and the potentials developed across the load resistance 37 are applied over a coupling condenser 38 to a modulator and transmitter 39, the output of the latter being applied to a suitable antenna 40, to be radiated into space for reception at remote locations.

Twenty-eight of the twenty-nine grids 21 above referred to, are connected to secondaries 20, and are, accordingly, subjected to potentials at 750 cycles per second, modulated in value in accordance with the strains measured by the gauges 8. The remaining one of the twenty-nine grids above referred to is likewise supplied with voltage derived from a strain gauge 8, the latter being subjected to a fixed adjustment adequate to provide 50% modulation of its input signal, i. e., its output is at half the amplitude of its input. This channel provides a reference amplitude with respect to which modulations provided by other gauges of the system may be compared.

The remaining channel, hereinafter denominated the master or sync channel, includes a plate which may be distinguished by application thereto of the reference numeral 24' and which is not connected in parallel with the plates 24 to the load resistor 37, but is connected to the input of a relatively high gain voltage amplifier 41, the output of which is applied over a coupling resistance 42 and a coupling condenser 43 to the lead 44 which extends between coupling condenser 38 and transmitter 39, for the purpose of pulsing the latter. The overall signal output of the master or sync channel must have appreciably greater magnitude than the greatest signal otherwise transmitted by the system, since the signal provided by the master channel, called the sync of master pulse, is utilized for synchronization and must be readily distinguishable from, and separable from, the remaining signals of the system, by virtue of its amplitude. The manner of generating the master pulse is explained hereinafter.

Returning now to the sampling or commutating tube 22, it will be recalled that the sweep voltage rotates at 1500 R. P. S. whereas the voltage applied to any of the grids has a frequency of 750 C. P. S. The purpose for which this ratio of 2:1 in frequency is provided is to enable sampling of positive and negative peaks, of signals applied to the grids, in succession. So, if we consider any one of the channels, and if we assume that the beam of electrons 28 traverses in aperture 26 or 27 associated with that channel just as the signal input to the grid 21 associated with that channel reaches its maximum positive value, then after completion of a scanning cycle of the beam, which requires $1/1500$ second, the signal voltage will have attained its maximum negative value, the change from maximum positive to maximum negative values requiring the time of one-half cycle or $1/2$ of $1/750$ second, which equals $1/1500$ second, for its completion.

Likewise, the rate at which the beam 28 sweeps, i. e. at one revolution in each $1/1500$ second, must equal the rate at which maxima or minima of amplitude of the signal are applied to the grids 21. In the present instant maxima of positive signal are applied to the grids 21 in rotation, for one-half $1/750$ second and thereafter maxima of negative signal are applied in rotation to the grids 21. Hence, as each of grids 21 attains its maximum positive or negative potential the beam 28 scans over the associated aperture, causing a current pulse to be developed in the associated plate 24 having a value determined by that maximum potential.

The voltages applied to the grids 21 are alternating currents, superimposed on a D. C. bias. While the actual value of the bias involves a matter of choice, in some degree, and is a function, further, of the particular commutating tube which may be employed in the practice of my invention, in the practical construction of a specific embodiment of my invention upon which is based the present disclosure, the grids 21 are biased positively, the D. C. positive bias being greater in magnitude than the maximum A. C. signal amplitude, so that the grid never goes negative. The illustration of Figure 2 of the drawings must be interpreted in the light of the above, the signals $A_1$, $A_2$, $A_3$, $A_4$ there illustrated representing A. C. components of D. C. pulsating voltages.

The signal in any one channel, accordingly, consists of pairs of pulses having alternately larger and smaller values, corresponding with the maxima and minima of the sine wave variations of D. C. bias voltage provided by the secondary 20 of the gauge 8 associated with the channel, which occur at the times of the positive and negative peaks of the sine waves supplied by the strain guage 8, the time separation between the alternate pulses corresponding to $1/1500$ second. In the course of each $1/1500$ second a sequence of relatively large pulses is generated, corresponding with positive signals phases, followed by a similar sequence of relatively small pulses, corresponding with negative signal phases.

The plate 24' of the tube 22 corresponding with the master channel is not fed with signal at 750 cycles, deriving from the source 1, as are all the other channels of the system. The grid 21 associated with the plate 24' is biased to a constant value by a convenient bias source, and as the beam 28 passes the aperture associated with the plate 24' there is produced a pulse of fixed amplitude in the output circuit associated with the plate 24', this pulse occurring once in each $1/1500$ second, at a fixed point or time position. Since the master pulse is not derived from sampling of a 750 cycle signal but is generated solely in response to beam sweep within the sampling tube 22, its value is not amplitude modulated but remains constant at all times.

Figure 2:
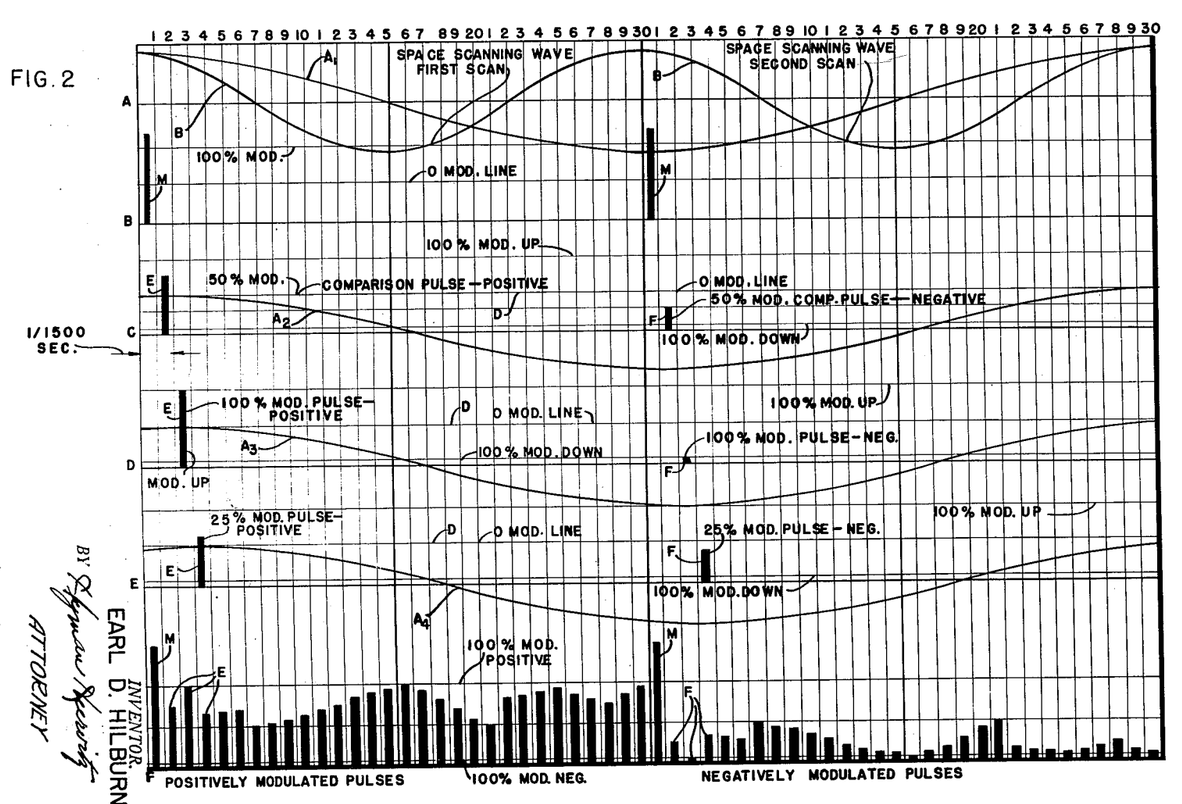
Figure 2 is a wave form and timing diagram useful in explaining the operation of the transmitter of Figure 1.

Reviewing now the operation of the transmitter (illustrated in Figure 1 of the drawings, and hereinbefore described in detail) by reference to timing diagrams provided in Figure 2 of the drawings, wave A represents the 750 cycle wave provided by the source 1 and applied via primary coils 5 to provide a rotating magnetic field within the thirty phase transformer 6. The transformer 6 provides thirty output waves, at frequency 750 cycles per second, and succeeding waves having a phase separation of $1/30$ cycle, and each phase being applied as a variation of D. C. bias to one of the grids 21 of the sampling tube 22, whence maxima of the A. C. component of the 750 cycle per second signals succeed each about the successive grids 21, first in positive phase, and then in negative phase, the maxima succeeding each other at intervals of $1/30 \times 1/750$ seconds. The phase multipled waves provided by the transformer 6 may be numbered, for purposes of identification, from A1 to A30, four such waves, identified by reference numerals A1 to A4 inclusive, being illustrated at lines $a$, $c$, $d$ and $e$, respectively, of Figure 2 of the drawings.

The wave provided by the power amplifier 32, and derived by frequency doubling from the source 1, provides a rotating electric field within the sampling tube 22, which causes a scanning of the apertures 26, 27 at the rate of 1500 cycles per second, so that two complete scanning operations take place as the waves A1 to A30 inclusive pass in sucession through their maxima, positive and negative, the space scanning phase being indicated at B of line $a$ of Figure 2.

The wave B, corresponding with the space rotating scanning wave is controlled to have a space phase such that as wave A1 reaches its maximum positive value, superposed on the bias of the grid 21 to which it is applied, and which may be identified as grid G1, the space scanning wave B has a space phase such that the beam 28 of the sampling tube 22 passes through the aperture C1 corresponding with the grid G1. The grid G1 is allocated to generation of master pulses, and corresponds with the grid previously identified by the reference numeral 21', and accordingly a master pulse M is generated during the maximum of wave A1, which is illustrated at line $b$ of Figure 2 of the drawings. A further pulse M is generated each time the space scanning wave B passes through its maximum value, which corresponds with a zero of space phase, or a space phase in alignment with aperture C1. Master pulses are accordingly generated at the rate of 1500 per second, at equal intervals of time.

The wave A2, illustrated at line $c$ of Figure 2 of the drawings, is retarded in phase with respect to wave A1, by $1/30$ of a cycle of the 750 cycle source, and is applied to the grid G2, which physically follows the grid G1 in the direction of space scanning. The electric field controlled by the wave B rotates a distance of $1/30$ of its total angle of revolution in the time corresponding with the phase difference between waves A1 and A2, and hence is aligned with aperture C2, and grid G2, just as wave A2 reaches its positive maximum value. The grid G2 is subjected to a comparison signal from a gauge 8, corresponding with 50% modulation. Accordingly, a pulse is generated having a maximum value 50% greater than the unmodulated value, the latter corresponding with the height of the line D.

The successive grids $Gn$ are scanned, in similar fashion, the space scanning wave B completing a cycle of rotation in the time required for the thirty successive sampling waves $An$ to pass through their positive maxima. As the electric field supplied by wave B aligns with successive ones of the grids $Gn$, the maxima of the waves $An$ are reached at these same grids, and the amplitudes of the waves $An$ sampled, successive pulses being generated, which are denominated E in Figure 2. On the succeeding cycle of rotation of the space scanning wave B the sampling waves $An$ pass through a succession of minima, providing a series of pulses F having amplitudes less than the unmodulated value D. The second master pulse M, line $b$, has an amplitude which is independent of the sampling waves, and which, therefore, does not change in value.

The comparison pulses, line $c$, alternately have values 50% above and 50% below the mean or unmodulated value M.

The remaining pulses in each channel have successive values first above and then below the unmodulated value D established by the bias applied to the grids 21, which are determined by the conditions of the strain gauges 8, and hence which are determinative of the desired measurements. Line $d$ illustrates a pair of pulses in channel #3 and line $e$ a pair of pulses in channel #4, the generated pulses in successive channels being equally spaced at time intervals of $1/30 \times 750$ seconds, equalling $1/22,500$ second.

Line $f$ of Figure 2 of the drawings presents pictorially a representative sequence of pulses as provided by all thirty channels of the system, in response to a pair of space schanning cycles B.

The first pulse of each group of thirty pulses represents a master pulse M, having an amplitude far greater than that corresponding with 100% positive modulation. The second pulse of each group represents the comparison pulse, having 50% modulation, and referred to hereinabove. The remaining twenty-eight pulses are information conveying pulses, positively modulated. The first pulse of the second group is again a master pulse, which is followed by a comparison pulse modulated 50% negatively, and further by twenty-eight information bearing pulses, negatively modulated. To avoid complete loss of signal in response to 100% negative modulation, and a low signal to noise ratio at high negative modulations, the system is adjusted to provide 100% negatively modulated pulses of a minimum amplitude falling on the line denoted "100% mod.," that value being arbitrarily chosen to provide an adequate signal to noise ratio for the system.

Figures 3, 4:
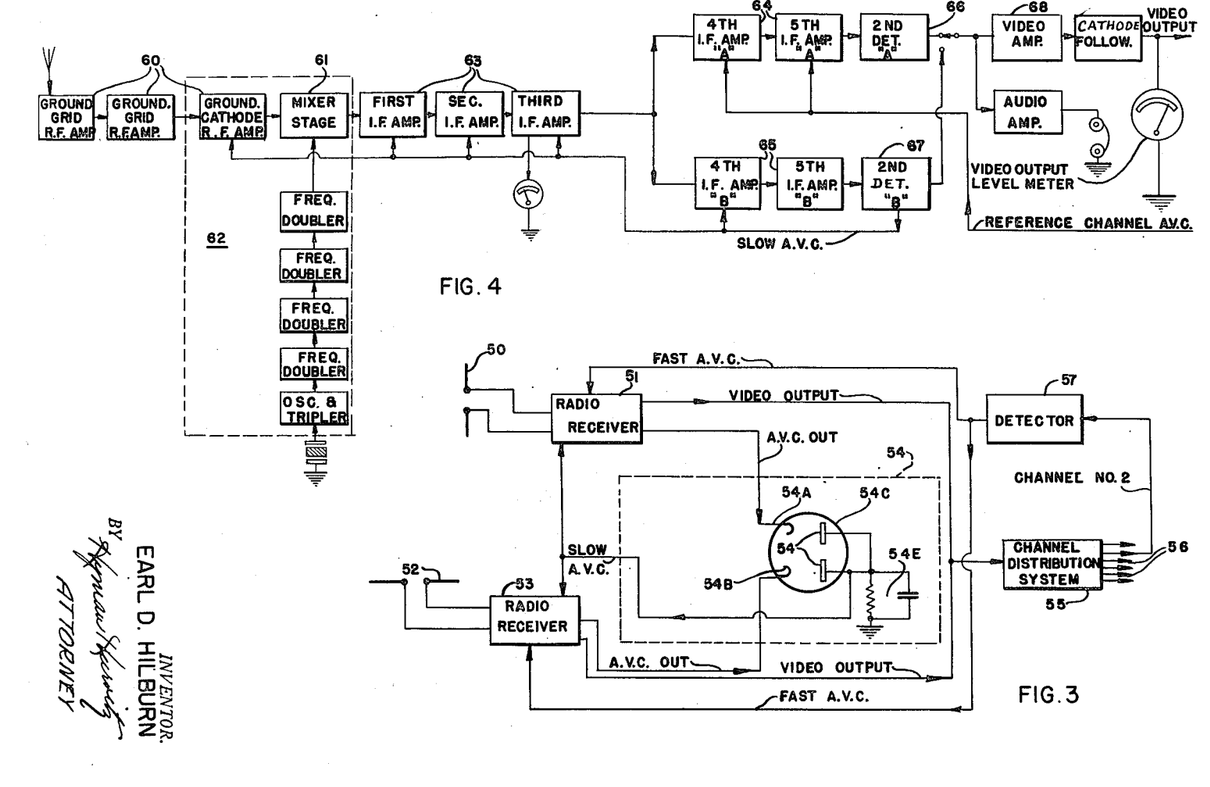
Figure 3 is a circuit diagram, largely in functional block form, of a signal receiving station, utilizing novel A. V. C. circuits, and diversity reception principles.
Figure 4 is a functional block diagram of one of the receivers employed in the station of Figure 3, illustrating in specific detail the mode of developing and applying A. V. C. voltage.
Figures 5, 7:
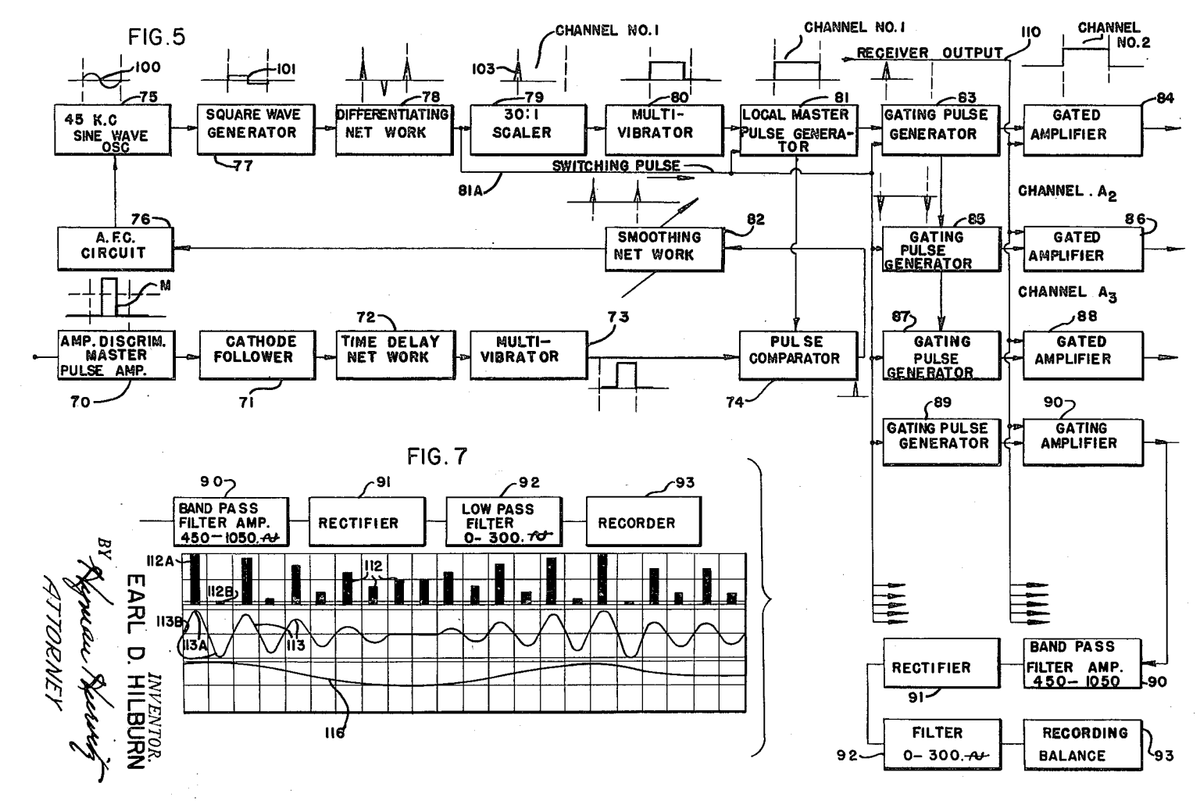
Figure 5 is a view in functional block diagram of a channel distribution system.
Figure 7 is a block diagram of a signal detecting channel, including wave forms of signals available at various points thereof.

Abstraction of pulses from corresponding channels in each group, and comparison of the positively and negatively modulated values, enables determination of the value of the gauged quantity in that channel, in a manner now to be explained, by reference to Figures 3, 4 and 5 of the accompanying drawings.

The design of the radio receiver, utilized for receiving the pulse signals generated and transmitted by the apparatus illustrated in Figure 1, may be of conventional character, in general, departing from the conventional only in respect to the manner of controlling amplification, or, otherwise stated, in respect to the A. V. C. circuits utilized.

Since received transmissions may be of any polarity, depending upon the attitude of the missile or aircraft being monitored, diversity reception circuits are utilized, operating simultaneously from a vertically polarized antenna and a horizontally polarized antenna. Relatively great and rapid amplitude variations of received signals are generated by the relatively rapid changes of distance and attitude, between receiver and transmitter, which occur in the normal intended use of the apparatus. Accordingly, I provide a composite A. V. C. circuit, which is responsive to slow variations of carrier amplitude, in the normal manner. I provide an additional A. V. C. circuit in which a voltage is developed rapidly in response to the reference or comparison pulse, occupied by channel #2 in the present system, and which acts to maintain output in channel #2 at a constant level. The combination of A. V. C. circuits has been found to provide sufficiently rapid and precise amplification control to enable accurate telemetric measurement in the system.

Referring now particularly to Figure 3 of the drawings, the reference numeral 50 represents a vertically polarized antenna, feeding a radio receiver 51, the horizontally polarized receiving antenna 52 applying signal to the radio receiver 53. The receivers 51 and 53 are shown interlocked by a diversity control circuit 54 which serves, in essence, to maintain in circuit only that one of receivers 51, 53 which is in receipt of the signal of greater magnitude.

The operation and structure of the diversity system, which is old per se, may be explained and described as follows. The output of each of receivers 51 and 53 is connected to one of the cathodes 54a, 54b of double diode detector 54c. The plates 54d of the tube 54c are connected in parallel to ground over a long time constant circuit 54e of the order of many times the channel repetition rate of 1500 cycles per second. The voltage developed across circuit 54e is applied to both receivers 51 and 53, as slow A. V. C. voltages, having values dependent on the average received carrier strength. The A. V. C. voltage is applied in a gain reducing sense, and being derived from two receivers, in parallel, has a value determined by the output of that one of the receivers which has the greater output. If it be assumed that one of the receivers 51 receives a signal of small amplitude, while the other, 53, receives a signal of large amplitude, the large A. V. C. voltage deriving from that latter signal, when applied to receiver 51 will tend to cut the latter off. Conversely, if receiver 51 receives the larger signal, receiver 53 will tend to cut-off. The diversity control 54 thus tends to cause reception to take place entirely via that one of receivers 51, 53 which receives the signal of larger amplitude.

The outputs of the receivers 51 and 53 are connected in parallel, and applied to a pulse channel separating or distribution circuit 55, hereinafter to be described, which functions to assort the thirty various channels into separate and distinct translating and recording circuits. The output of channel #2, the reference or comparison signal channel, after detection, is constituted of a direct current voltage, which, if the system is performing properly, is of constant value. The value of the D. C. reference signal may vary, due to variations in transmission path characteristics between the receiver and the transmitter, or to variations of ambient conditions at the transmitter, or for other reasons, and accordingly the D. C. reference signal is applied to the receivers 51, 53 as a fast A. V. C. voltage. There is shown, accordingly, a plurality of output leads 56, deriving from the channel distribution system 55, that lead which corresponds with channel #2 being applied to a detector 57 having a relatively short time constant of the order of several groups of channels, and the output of which is applied to receivers 51 and 53 as A. V. C. voltages, in known fashion.

Reference is now made to Figure 4 of the drawings, wherein is illustrated in schematic block diagram one of the receivers 51, 53 of Figure 2, illustrating various details thereof, and particularly the mode of developing A. V. C.

The receiving antenna, which may correspond with either 50 or 52 of Figure 3, is coupled to a plurality of cascaded R. F. amplifiers 60, the output of which is applied to a mixer stage 61, to which is also applied local oscillator signal deriving from a source 62, which may be crystal controlled. The receiving frequency and the local oscillator frequency may be selected at the will of the designer. The output of the mixer stage 61 may be applied to a three stage I. F. amplifier 63, the output of which is divided in two channels, each comprising a pair of cascaded I. F. amplifier stages, 64 and 65, which are followed by detectors 66 and 67, respectively, in the separate channels.

The output of detector 66 is applied to a video amplifier 68, and thence to a video output circuit leading to the channel distribution system, hereinafter described in detail. The output of the detector 67 is applied as slow acting A. V. C. voltage to the I. F. amplifier stages 63, and to one or more of the stages of I. F. amplifier 65, and, if desired, to one or more of the radio frequency amplification or preselection stages 60. The time constant of the detector 67 is made sufficiently long to enable compensation of receiver gain for wide variations in receiver input voltage.

Rectified and filtered signal deriving from the reference channel A2 is applied to the I. F. amplifiers 64, to provide a fast acting reference channel A. V. C. voltage to maintain constant the demodulated receiver output.

Referring now particularly to Figure 5 of the accompanying drawings, there is illustrated in schematic block diagram a channel distribution system, in accordance with the invention. A wave form and timing diagram, for facilitating proper understanding of the system of Figure 5, is provided in Figure 6.

The master pulse M, transmitted over channel #1 in the present system, is separated from the receiver composite signal by means of an amplitude discriminating master pulse amplifier 70, which passes only signals having greater than a predetermined amplitude. The output of the master pulse amplifier 70 is transferred over a cathode follower impedance matching circuit 71, which feeds a pulse integrating or time delay network 72, the output of which controls a multivibrator 73, the latter providing a square pulse of fixed amplitude for application to a pulse time comparator 74. It will be recalled that master pulses occur once each $\frac{1}{1500}$ second, in channel #1, provided the signal wave generator 1 (Fig. 1) does not vary from its assigned frequency of 750 cycles per second. The assigned period of the master pulses is, however, tied to the frequency of the signal wave generator 1, and varies with the latter.

The time constant or integrating circuit 72 consists of a coupling RC circuit having a relatively long time constant, and which, accordingly, passes the master pulses M but is not responsive to short static pulses and spurious noise signals, thus insuring that the multivibrator 73 operates only in response to master pulses M, and, further introduces a delay of one quarter channel in the timing of the master pulse, for purposes which will appear hereinafter.

A sine wave oscillator 75 operating at 45 kc. is provided, which is controllable in respect to frequency by means of an automatic frequency control circuit 76, which may be of the reactance tube type, or of the servo-motor type, as desired. It will be noted that the frequency of 45 kc. is equal to the master pulse frequency of 1500 cycles per second, multiplied by 30, the number of channels in the present system, and hence corresponds with the total number of channels per second, in the system.

The output of the generator 75 is applied to control a square wave generator 77, which operates by clipping the output of generator 75, providing 45,000 square waves per second, the latter being differentiated in a differentiating network 78 to provide 45,000 sharp positive pulses per second, one at the commencement time of each channel, and occurring simultaneously with the commencement times of the channels.

The differentiated pulses are applied to a 30:1 scaler, or frequency divider, 79, the output of which consists of sharp pulses which occur at intervals of 1/1500 second, at the initial point of channel #1, and which are applied to synchronize a multivibrator or square pulse generator 80, one square positive wave being generated, in response to each sharp pulse, the square wave having a duration slightly shorter than that of channel #1. The square waves are utilized to unlock a local master pulse generator 81 for providing square positive pulses, one channel wide, for controlling interchannel signal distribution. The generator 81 operates in response to a sharp pulse H derived from differentiator 78 via lead 81a, when the latter is present conjointly with the output of multivibrator 80. In this manner the time of commencement of the pulse output of pulse generator 81 is made dependent upon the phase of sine wave oscillator 75, in a fairly direct manner, and is independent of time delays or variations introduced by scaler 79 and multivibrator 80.

Since the master pulse generator 81 provides positive pulses for times corresponding with the duration of channel A1, and since no telemetric information is conveyed by this channel, the master pulse generator 81 may be denominated a dummy channel triggering circuit.

The output of the local master pulse generator 81 may be applied to the pulse comparator 74, for comparison of the time of its occurrence with the time of occurrence of the externally generated master pulse provided by the master pulse amplifier 70. Failure of coincidence of pulses provided by generators 70 and 81 indicates lack of frequency coincidence between generator 45 and the transmitter located channel control generator 1; and in response to such lack of coincidence voltage is generated at the pulse comparator, which, applied over a suitable time delay or smoothing network 82, acts as an automatic frequency control voltage for application to the A. F. C. device 76, to vary the frequency of the oscillator 75, until coincidence of pulse output from multivibrator 73 and from local master pulse generator is attained.

Accordingly, deviation of the frequency of the transmitter channel control oscillator 1, from its normal assigned value of 750 ∼ is compensated for at the receiver by a corresponding shift of frequency of a receiver channel control or local master pulse oscillator, 81, and the transmitter and receiver are consequently maintained constantly in precise synchronism. This mode of operation, in addition to providing precise synchronism between transmitter and receiver has an additional advantage, in that should the receiver fail to receive one or more synchronizing pulses no loss of synchronism or of interchannel control will occur at the receiver, since synchronisation and control is effected by locally generated pulses.

The positive half of the square wave output of the local pulse generator 81 terminates at the boundary between channels #1 and #2. The decay of the positive half of this square wave output is utilized to generate a sharp pulse, by differentiation, at the channel boundary, which is applied to gating pulse generator 83 to cause the latter to generate a gating wave, extending in a positive sense, for the duration of channel #2, and which is applied as unblocking signal to the gated amplifier 84.

The decay of the channel #2 positive gating pulse is differentiated, in the gating pulse generator 83, to provide a control pulse to the gating pulse generator 85, to cause the latter to provide an unblocking wave, extending in a positive sense for the duration of channel #3, and which is applied to gated amplifier 86 to unblock the latter.

In this manner, the gating waves which serve to unblock each of the channels #2–#29 inclusive in succession provide control pulses to succeeding gating pulse generators, at the boundary between adjacent channels, to unblock the channels in succession and at the proper instant to accept the signal present in the channel. The output of the differentiating circuit 78 is likewise applied to all the gating pulse generators, in parallel, and in blocking sense, i. e. in such manner as to cause all the gating wave generators, except that one to which is applied an interchannel positive control pulse, to cut-off, and hence to block the associated channels. The cut-off pulses coincide with the positive unblocking pulses, and actuates all channels to cut-off except that one which is the simultaneous recipient of a blocking pulse and an unblocking pulse.

The signal output from the receivers 51, 53 is applied to all the gated amplifiers 84, 86, 88, 90, . . . in parallel, each amplifier being enabled to abstract only the signal pertinent thereto by reason of the fact that it is unblocked for the duration of only the proper channel.

The actual width of the signal pulses is approximately 50% of the channel widths, to minimize inter-channel interference, or cross-talk.

The output of each of the various channels is each applied to a band-pass filter 90, passing a band of frequencies extending from 450–1050 cycles, to enable passage of the 750 cycle component of pulse frequency together with amplitude modulations of that component. The pass band of filters 90 is determined by the frequencies of the modulation components in the 750 cycle signal, which are thus assumed to extend from zero to 300 cycles per second, in the exemplary application of the system of the invention. Obviously, a greater modulation band width may be accommodated by suitable increase of width of pass-band of the filter 90. The output of each filter 90 is applied to a detector or rectifier 91, for detection of the modulation components, the output of the detector working into a low-pass filter, 92, capable of passing the modulation frequencies present on the 750 cycle carrier, i. e. 0–300 cycles in our example.

The ouputs of the low pass filters may be applied directly to a series of twenty-nine recording galvanometer 93, each associated with one of the channels #2 to #30, and each recording the magnitude of the modulation envelope of a 750∼ signal, deriving from one of the time divided channels.

Figure 6:
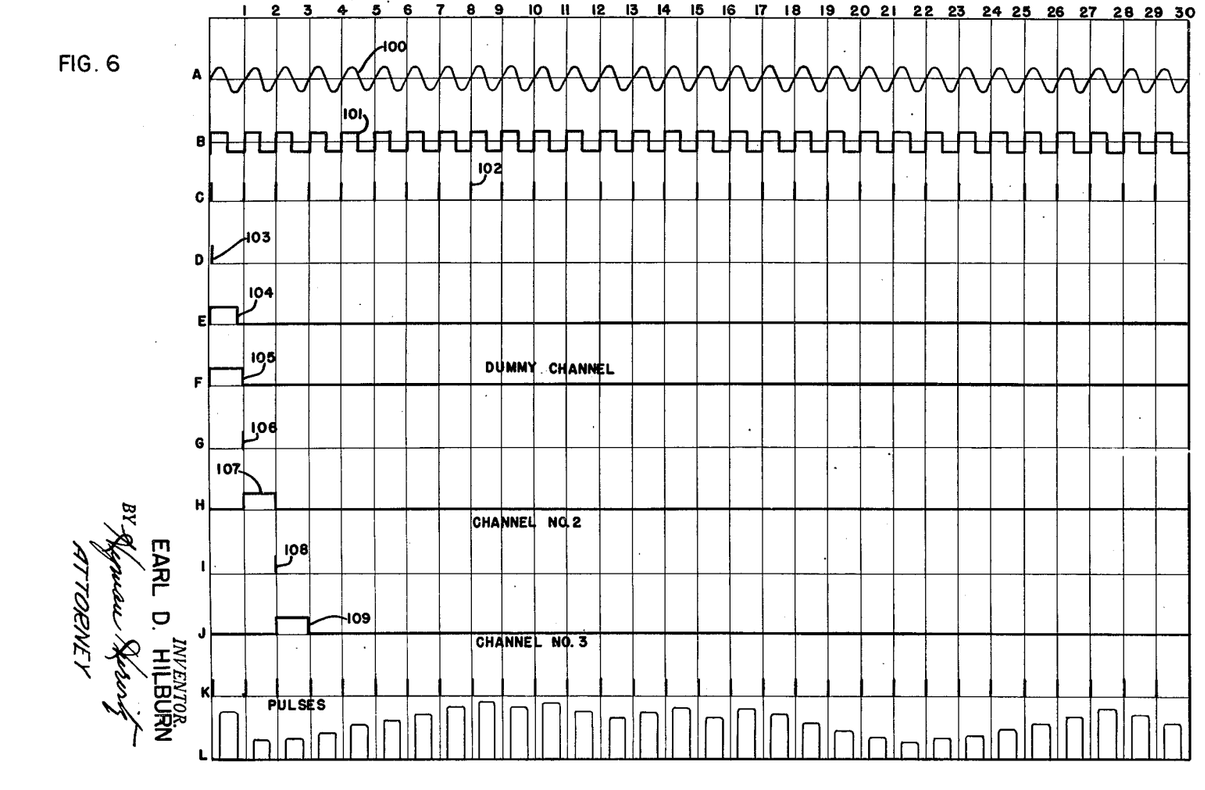
Figure 6 is a wave form and timing diagram, useful for facilitaing a proper understanding of the system of Figure 5.

Reviewing now the operation of the inter-channel distribution system of Figure 5, by reference to the timing diagram of Figure 6, line a of Figure 6 shows a sine wave signal 100 as provided by the sine wave oscillator 75, having a frequency of 45 kc. and a phase such that each cycle of the wave completely fills a channel, with zero amplitude increasing of the wave at the initial point of the channel.

The output of the sine wave oscillator 75, as illustrated by the wave 100, Figure 6, is applied to a square wave generator 77, which clips the positive and negative peaks of the wave 100 to provide square waves 101, of the same frequency and phase as the sine wave 100. The output of the square wave generating circuit 77 is applied to a differentiating circuit 78, which provides at its output sharp pulses 102, in response to decay of the square wave pulses, from positive to negative values. These pulses all occur, then, precisely at the boundary points between the channels of the system, so long as the frequency of the sine wave oscillator 75 is precisely thirty times the frequency of the sine wave oscillator 1 associated with the transmitting equipment.

From the pulse output of the differentiator 78, by a process of frequency division or scaling, is derived from 30:1 scaler 79, a series of sharp pulses 103, occurring at the rate of 1500 cycles per second, i. e. at the channel repetition rate, or at the master or sync pulse repetition rate. The pulses 103 are applied to multivibrator 80, which provides at its output one square pulse 104 in response to each pulse 103, the latter extending for a time duration of slightly less than one full channel, commencing however, precisely at the beginning of each channel.

The output of the multivibrator 80 is applied to the local master pulse generator 81 in a positive sense, the output 102 of the differentiator 78 being simultaneously applied thereto in a negative sense. Application of the pulses 102 to the master pulse generator 81, in a negative sense, serves to cut off the master pulse generator 81, but simultaneous application thereto of the output of the multivibrator 81 serves to turn it on, so that master pulses are generated at the rate of 1500 per second, so long as the sine wave oscillator 75 operates at its normal frequency of 45 kc.

The output of the master pulse generator is applied to the pulse comparator 74 for comparison of its time position with that of master pulses M provided by the transmitter (Figure 1). The output of the comparator 74 is an automatic frequency control voltage which is applied to the A. F. C. circuit 76 to control the frequency of the sine wave oscillator 75 to establish and maintain time coincidence between the master pulses M and the locally generated master pulses 105.

The decay of the output wave 105 of the local master pulse generator 81 is differentiated to provide a sharp pulse 106 which is applied to a gating pulse generator 83, which generates in response thereto, a gating wave 107, for gating open a normally blocked amplifier 84, associated with channel #2 of the system, channel #1 being devoted to synchronization, and hence conveying no information, its output is not recorded. The differentiation of the pulse 105, to provide pulse 106, is accomplished by the input circuit (not shown) of the gating pulse generator 83.

The gating pulse 107 is further applied to the #3 channel gating pulse generator 85, where its decay or back slope is differentiated to provide a control pulse 108 for the generator 85, which in response generates a gating pulse 109 for normally blocked amplifier 86 of channel #3, unblocking the latter.

Each gating pulse then, is generated in response to the termination of the preceding gating pulse, and succeeding gating pulses are applied to open succeeding channels, channel #4 comprising gating pulse generator 87 and gated amplifier 88, channel #5 of gating pulse generator 87 and gated amplifier 88, etc., etc.

The output of receivers 51 and 53, is applied over lead 110 to the input circuits of all the gated amplifiers 84, 86, 88, 90, etc. in parallel, and simultaneously. The amplifiers 84, 86, 88, 90, etc. are time gated, as explained above, each to transfer any signals within the channel associated therewith.

In order to assure that the gating pulse generators 83, 85, 87, 89, . . . are cut-off except in response to an on pulse 106, 108, . . . from a preceding generator, there is applied to all the gating pulse generators, in parallel and simultaneously, pulses 102 deriving from the differentiating network 78. These serve to cut-off all the gating pulse generators 83, 85, 87, 89, . . . except that particular one to which, simultaneously with one of pulses 102, is applied an on pulse from a preceding gating pulse generator. The pulses 102 further are operative to cut-off the operative one of gating pulse generators 83, 85, 87, 89, precisely at the boundary between channels, thus establishing the channels by direct reference to the sine wave oscillator 75.

The outputs of the gated amplifiers 84 are applied each to a signal detecting channel, a representative channel being indicated in Figure 7 of the drawings. The signal channel of Figure 7 comprises a band-pass filter and stabilized amplifier 90, which cuts-off at about 450 cycles per second at its low end and at 1050 cycles per second, at its high end, transforming the successive 750 cycle pulses 112 of unequal amplitude to a modulated sine wave signal 113, at a frequency of 750 cycles per second, by eliminating from the pulses 112 frequency components having values above 1050 cycles per second and below 450 cycles per second.

The amplitude modulated succession of pulses impressed on the band pass filter 90, occurring at the rate of 1500 pulses per second, alternate pulses varying alternately above and below a median value, is found to contain, when analyzed by the Fourier or equivalent method of wave analysis, a 750 cycle frequency component. This component arises solely from the repetition rate of the pulses. If alternate pulses had fixed amplitudes, first above and then below a median value, a 750 cycle Fourier component of constant amplitude, and hence without accompanying side-bands, would be present. In the present invention however, a variation of amplitudes of the pulses of succeeding pairs of pulses takes place, which represents side-bands of the basic 750 cycle wave.

The pulses 112, when analyzed by the Fourier or equivalent method for frequency content, is found to contain an infinite number of frequency components. It is the function of the band pass filter 90 to exclude all frequency components except the 750 cycles per second signal and its associated side-bands, i. e. those frequency components which contain information pertaining to the amplitudes and time separations of the pulses 112, as distinguished from their pulse shapes. These frequency components are (1) a carrier at 750 cycles per second, and (2) side frequencies extending above and below the 750 cycle per second carrier, the maximum significant component of which, in the present embodiment of my invention, involves a 300 cycle per second signal. Since the minimum pulse repetition rate in the system is 750 pulses per second, i. e. the rate of recurrence of the positively or the negatively modulated pulses, no component of frequency due to the factors pulse shape and pulse repetition rate are present at values below 750 cycles. The filter 90 might well be, then, a low pass filter, cutting off at 1050 cycles per second. A band pass filter is utilized, however, to minimize hum pick-up and increase signal-to-noise ratio.

Referring more particularly to Figure 7 of the drawings, the amplitudes of the pulses 112 determine the amplitudes of the sine waves 113, each positively modulated pulse 112a determining the amplitude of a positive half cycle 113a of the sine wave 112 and each negatively modulated pulse 112b the amplitude of a negative half cycle 113b of the sine wave 112.

As the modulation of the pulses varies, the amplitude of the corresponding sine wave varies, the rate of such variation corresponding with the modulation rate of the sine wave. The highest modulation rate encountered is assumed to be 300 cycles per second, for the sake of example only, the modulation side bands being thus enabled to pass through the filter 90.

The output signal 113 of the band-pass filter and amplifier 90 is detected by means of a rectifier 91, having associated therewith a low-pass filter 92, which passes frequencies in the band 0–300 cycles per second, corresponding with the modulations on the original pulses 112. The output of the filter 115, shown at 116, is applied to a recording galvanometer 93, which records the amplitudes of signals applied thereto, thus reproducing on a time fed record receiving surface the measurements made originally by a gauge 8, at the transmitter.

Twenty-nine recording galvanometers 93, and associated signal translating circuits are provided, to enable reproduction of measurements accomplished by the twenty-nine gauges 8, utilized in the system.

It will be recalled that channel 2 provides a reference signal, deriving from an unmodulated one of the gauges 8. Accordingly, the galvanometer associated with channel 2 provides a recorded trace which should remain constant. Any variations in amplitude of signals in channel #2 may be assumed to derive from a variation in the ambient conditions under which the measurements are made, and since these conditions may be assumed to be common to measurements made in all the channels, calibration of recorded values may be readily accomplished.

Figure 8:
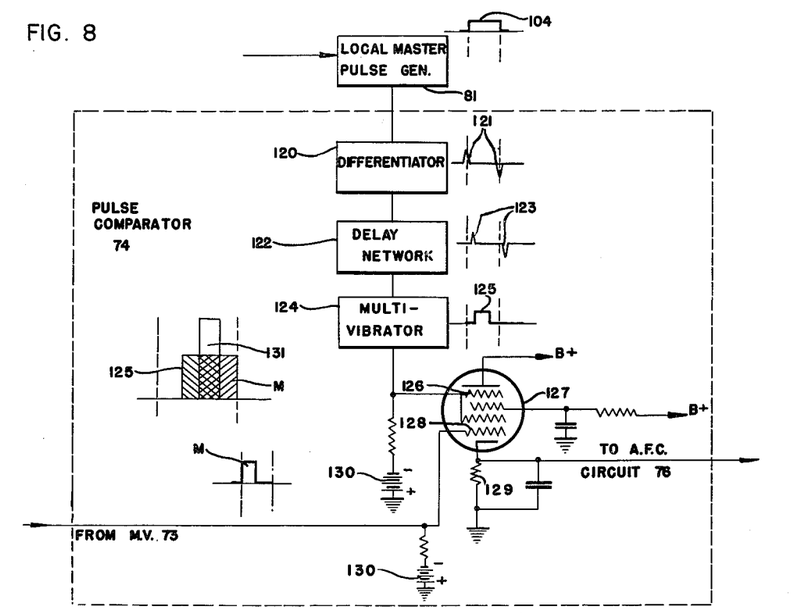
Figure 8 is a circuit diagram, largely in functional block form, of a pulse comparator employed in the system of Figure 5.

For further explanation of the pulse comparator 74, which is illustrated as a single functional block in Figure 5 of the drawings, attention is directed to Figure 8 of the drawings for a detailed illustration of a suitable circuit for performing the function of the pulse comparator 74.

The output of the local master pulse generator 81 consists, as has been explained, of a single square wave 104, which extends completely across channel #1. This square wave is applied to a differentiator 120, which provides at its output a pair of pulses 121, at the boundaries of channel #1, of which the first is positive. The pulses 121 are passed through a delay network 122, which delays the pulses for a time equal to one quarter of a channel width, the output pulses being identified by the reference numeral 123. The positive pulse of the pulses 123 is applied to multivibrator 124, which is designed to generate a pulse 125 having a duration equal to 50% of the channel width. This pulse then corresponds with the local master pulse, but is of the proper duration, and position in channel #1, to enable pulse comparison with the output of multivibrator 73, which also consists of a square pulse of 50% channel width, and of predetermined amplitude. The position within channel #1 of the pulse 125 is attained, of course, only when the wave generator 75 is of proper phase and frequency.

The output pulse 125 of the multivibrator 124 is applied to a grid 125 of a tube 127, the pulse M deriving from the multivibrator 73 being applied to a further grid 128 of the tube 127. The peak value of output in the cathode load circuit 129 of the tube 127 is then a function of the duration of overlap of the pulses M and 125, the grid 126 and the grid 128 being negatively biased by potential sources 130 to a sufficient extent to prevent output current in cathode load circuit 129 in the absence of superposition of pulses. Maximum load current then flows in the cathode load circuit 129 of tube 127 upon complete superposition of pulses M and 125, the output current decreasing as the pulses depart from superposition.

The oscillator 75 (Figure 5) may be set to oscillate at a given rate, say at 45 kc., for a predetermined overlap of the pulses M and 125, a 50% overlap being actually employed. If now the frequency and phase of the received master pulses M and of the local master pulses 125 are not identical, the A. F. C. voltage developed across the circuit 129 is insufficient to maintain the frequency of the oscillator at its frequency of 45 kc. and the oscillator may, by proper design of the frequency control circuit 76, be caused to increase its output frequency sufficient to cause the pulses 125 to overtake the pulses M. As the pulses 125 creep by the pulses M, by reason of their greater frequency there is reached a point at which some overlap of pulses 125 and M occurs, at 131, in response to which the tube 127 develops an A. F. C. voltage which reduces the frequency of the oscillator 75. This reduction of frequencies is a continuing process, which continues until the A. F. C. voltage provided by the tube 127 is of the proper magnitude to establish an output frequency in oscillator 76 which is precisely that required to maintain that state of coincidence between pulses M and 125, which is required to maintain the proper oscillator frequency. Any future change of pulse rate of pulses M is then accompanied by a change in A. F. C. voltage, either to increase or decrease the latter, according as a decrease or increase of frequency of oscillator 75 is required to re-establish pulse coincidence.

It will be realized, from the above description of the operation of the control system for oscillator 75, that the latter should preferably be designed to provide an output frequency greater than 60 times the greatest possible frequency of oscillator 1 (Figure 1), in response to minimum A. F. C. voltage, and a frequency less than 60 times the smallest possible frequency of oscillator 1 (Figure 1), in response to maximum A. F. C. voltage.

The smoothing network 82 may be made of variable delay time. Upon initiating an operation of the system the delay time is set for short delay, so that any transient overlap of the locally and remotely originating sync pulses will enable the A. F. C. circuits to seize control of the system. After control has been seized, the delay time is readjusted to have a great extent, and thereby to prevent loss of synchronization upon transient loss of master pulses M.

Figure 9:
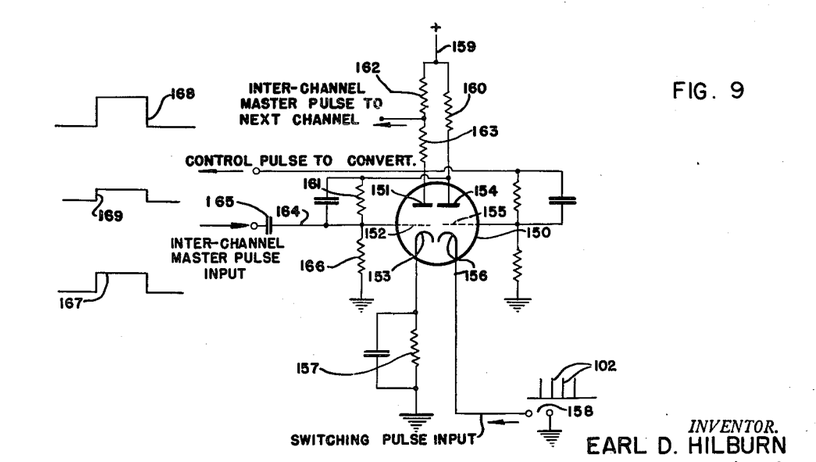
Figure 9 is a circuit diagram of a gating pulse generator, of the type utilized in the system of Figure 5 of the drawings.

Reference is now made particularly to Figure 9 of the drawings, wherein is illustrated a circuit diagram of a gating pulse generator, of the type identified by the reference numerals 83, 85, 87, 89 . . . in Figure 5 of the drawings.

The gating pulse generator of Figure 9 comprises a double triode 150, connected to operate as a multivibrator or flip-flop circuit; and comprising a first triode section having a plate 151, a control grid 152 and a cathode 153, and a second triode section having a plate 155 and a cathode 156.

The cathode 153 is connected to ground over a self bias circuit 157. The cathode 156 is connected to ground over signal injection terminals 158, to which are applied, in positive sense, sharp positive pulses 102 deriving from differentiator 78 of Figure 5 of the drawings, and which occur precisely at the boundaries of the channels.

The pulses 102, being applied to the cathode 156 in a positive sense, tend to increase the internal resistance of the second triode section, comprising cathode 156, thereby increasing the voltage on the plate 154 of the triode section. The voltage on the plate 154 is derived from a source 159 over a dropping resistance 160, and the internal resistance of the triode section and the resistance 160 being in series, constitute effectively a potentiometer, the voltage on the plate 154 being determined by the current flowing in resistance 160.

The plate 154 is coupled to the grid 152 of the first triode section, over an RC network 161, an increase in the voltage of plate 154 being accompanied accordingly by an increase in the voltage of grid 152, which in turn causes an increase in current flow from source 159, and via dropping resistors 162 and 163, in series with each other, and with the plate to cathode of the first triode section. The plate voltage at plate 151 accordingly drops, or is relatively negative, and, the plate 151 being connected directly with a gated amplifier, as 84, 86, 88 . . . the latter is cut off.

A tap is taken from the junction of resistors 162 and 163, which is connected from each gating pulse generator to a succeeding one, to initiate action of the succeeding generator in response to termination of the operation of the preceding one. The input pulse from a preceding gating pulse generator, on the other hand, is applied to grid 152 via a lead 164, and a differentiating network consisting of condenser 165 and resistor 166, the grid 162 being connected intermediate the condenser 165 and the resistor 166, and the latter providing a leak to ground for the grid 162.

Upon application to the lead 164 of a positive inter-channel pulse, as 167, the leading edge of the pulse is differentiated by the differentiating circuit comprising condenser 165 and resistor 166, providing a short positive pulse, which serves to reduce the voltage on plate 151, at the junction of resistors 162 and 163. The effect accordingly is additive to that produced by the switching pulses 102, and no gating wave output is available.

Upon decay of the wave 167, at its trailing edge, a negative pulse is applied to the grid 152, which increases the positive potential at plate 151. That increased potential is applied to grid 155, which causes a decrease of potential at the plate 154, which is in turn applied to grid 152, so that in a short time the first triode section is cut off and plate 151 and the junction between resistances 162 and 163 acquires the potential of source 159. This action occurs despite the presence of switching pulses 102, which tend to counterbalance or prevent the action, by reason of the relative magnitudes of pulses 102 and the inter-channel pulses 167, the latter providing the controlling effect.

The potential available at the junction of resistances 162 and 163 is applied to a succeeding channel as an inter-channel control pulse 168, and the potential at the plate 151 is applied as a gating wave 169 to the gated amplifier in the proper channel.

At the termination of the desired gating period, i. e. at the boundary between adjacent channels, a further pulse 102 is applied to terminals 158. There being no signal applied to lead 164 at this time, the pulse 102 takes control, rendering plate 154 more positive, which in turn renders grid 152 more positive. The potential of plate 151 then drops, and this drop is communicated to grid 155. The action is cumulative, and finally results in a cut-off status at the second triode section, and a fully on status at the first triode, terminating the gating wave.

Succeeding switching pulses 102 merely confirm the last noted status, until a further inter-channel control pulse is applied to lead 163, during a succeeding cycle of inter-channel switching.

It will be realized that, while I have described and illustrated the system of the present invention as applied to the telemetric reading of strain gauges, that the system is not limited to such applications, but that many different modes of modulating the waves provided by the transformer 6 may be employed without departing from the true spirit and scope of the invention. Specifically, for example, I may employ a vacuum tube modulator to which may be applied a D. C. modulating or control signal, for modulating the output of secondary 7 of transformer 6, in place of a strain gauge 8 for accomplishing similar modulation. The recorders 93 (Figure 7) will then record values of this D. C. signal. Obviously the D. C. signal may have an amplitude determined by a measured quantity.

While I have described and illustrated one specific embodiment of my invention, it will be clear that variations in the general arrangement and in the character of specific components may be resorted to without departing from the true spirit of the invention as defined in the appended claims.

What I claim and desire to secure by Letters Patent of the United States is:

1. In combination in a multiplex communication system, a commutating tube having a plurality of electron collecting plates, a control grid associated with each of said plates, an electron beam, and means for scanning said electron beam across the said grids and plates in succession periodically at a first predetermined frequency, said means for scanning comprising a source of signal at one half said first predetermined frequency, means for multiplying the frequency of said source of signals by a factor of two, said means for multiplying being adapted and arranged to have a phase of output signal which is independent of the frequency of signal applied thereto for frequency multiplication, said means for scanning further comprising a plurality of angularly spaced scanning electrodes associated with said commutating tube, a phase splitting transformer having a plurality of secondary coils for providing a plurality of phase displaced voltages, means for connecting each of said secondary coils with one of said scanning electrodes, means coupling the primary circuit of said transformer with the output of said means for multiplying, and means for modulating the voltages of the grids of said commutating tube at a rate corresponding with the frequency of said first mentioned source of signal.

2. The combination in accordance with claim 1, wherein said means for multiplying comprises means for distorting the output of said first mentioned source of signals to provide a series of harmonics arranged in arithmetic progression and having alternate harmonics omitted, and means for selecting one of said series of harmonics comprising a broadly tuned non-self-oscillatory filter.

3. The combination in accordance with claim 1, wherein said means for multiplying comprises means for distorting the output of said first mentioned source of signals to provide signals of even harmonic content only, and broad band circuit means for accepting only a selected one of said signals of even harmonic, whereby slight frequency changes of said source of signals are ineffective to produce phase changes in the output of said means for multiplying.

4. In a telemetric system, means comprising a multi-phase transformer for establishing a plurality of time divided multiplex channels of communication, means comprising an additional multi-phase transformer for modulating each of said channels in succession, and means for driving said transformers at a pair of harmonically related frequencies derived from a single source of frequencies, said last named means comprising a frequency multiplier having an output phase independent of input frequency over a predetermined range of values of said input frequency.

5. In combination, in a multiplex telemetric system, means for transmitting periodic sequences of signals, each sequence consisting of a master pulse, a reference pulse modulated in amplitude to a predetermined and constant percentage of modulation, and a series of further pulses each modulated in amplitude to a percentage of modulation determined by the value of a telemetric quantity, a gain controllable receiver for said periodic sequences of signals comprising means for detecting the modulations of said pulses, and means responsive to the amplitude of the detected modulation of said reference pulse for controlling the gain of said receiver to maintain constant said amplitude.

6. In combination in a multiplex telemetric system, radio means for transmitting periodic sequences of signals, each sequence consisting of a plurality of pulses and each pulse consisting of a train of radio carrier waves, means for establishing one of said pulses at a fixed amplitude, means for establishing the remainder of said pulses at values proportioned with respect to the amplitude of said one of said pulses in accordance with values of measurable quantities, a receiver for receiving said pulses and for detecting said pulses to establish output signals, means responsive to the detected amplitude of said one of said pulses for generating an automatic gain control voltage, and means for applying said gain control voltage to maintain constant the detected amplitude of said one of said pulses.

7. The combination in accordance with claim 6 wherein said receiver is provided with a further gain control circuit response to average carrier amplitude of said received pulses.

8. In a time division multiplex radio system, means for establishing periodically repeated timed sequences of pulsed radio frequency carrier trains, means for modulating predetermined pulses of each sequence in accordance with the values of measurable quantities, correspondingly timed pulses of adjacent sequences of pulses being modulated in opposite senses, means for modulating further predetermined pulses of adjacent sequences in a predetermined degree, said further pulses of adjacent sequences being modulated in opposite senses, receiver means for said pulses comprising means for distributing said pulses to receiver channels in accordance with the positions of the pulses in the timed sequences, means for detecting the pulses in the separate channels to obtain unidirectional detected signal in each channel having an amplitude determined by the modulations on the pulses in each channel, means for developing a fast automatic gain control voltage in response to the detected signal in the channel carrying the said further predetermined pulses, means for applying the said gain control voltage to said receiver to effect maintenance of said last-mentioned detected signal at constant amplitude, and means for further controlling the gain of said receiver in response to average carrier amplitude of said received pulses.

9. In a telemetric system, a channel distributing electronic tube having a source of electrons, a plurality of electron collecting plates, an electron beam modulating grid associated with each of said plates, means for forming electrons derived from said source of electrons into an electron beam, means for rotating said beam of electrons to scan said plurality of electron collecting plates in succession at a first predetermined frequency, means comprising a multi-phase transformer for generating a plurality of signals at a second predetermined frequency, the signals of said plurality being phase separated by equal phase angles, means for modulating each of said plurality of signals, means for applying to each of said grids one of said plurality of modulated signals, the frequency of rotation of said beam of electrons being equal to twice the second predetermined frequency, and the phase of the rotation being adjusted to orient the beam of electrons toward any selected one of said grids at the moment of maximum value of the signal applied thereto.

10. In a time division multiplex system, means comprising a multi-phase transformer for generating a plurality of sine wave signals of equal frequency and in mutually equally displaced phase, means for modulating each of said plurality of signals, and means for sampling each of the modulated signals each always at its peak positive and peak negative value.

11. In a communication system, means comprising a multiphase transformer for generating a signal having successive equally displaced maximum and minimum values, means for generating a pair of time spaced pulses having amplitudes always proportional one to the said maximum value and one to the said minimum value, and time spacing equal to the time spacing between said values, and means for transmitting said pulses as a measure of the amplitude of said signal.

12. In a communication system, means comprising a multi-phase transformer for generating a signal having successively equally time displaced maximum and minimum values, means for modulating the amplitudes of said maximum and minimum values, means for generating a pair of time spaced pulses having amplitudes always proportional one to the said maximum and the other to the said minimum value and time spacing equal to the time displacement between said values, and means for transmitting said pulses as a measure of the degree of modulation of said amplitudes.

13. In a communication system, means comprising a phase shifting transformer for generating a sine wave signal having a predetermined phase, means for modulating said sine wave signal in respect to amplitude, means for generating a pair of pulses, one of said pulses having always a time position coinciding with the maximum positive value of said sine wave and an amplitude depending upon the difference of amplitude of said maximum positive value and an arbitrary value, the other of said pulses having always a time position coinciding with the maximum negative value of said sine wave and an amplitude depending upon the difference of amplitude of said maximum negative value and an arbitrary value.

14. In a time division multiplex system of radio communication, means for generating a beam of electrons, means for sweeping said beam of electrons in a predetermined path, means for intercepting said beam of electron comprising a plurality of adjacent grid and electron collecting plate pairs, means comprising a multi-phase output transformer for applying to each of said grids an alternating current voltage, means for synchronizing the sweep rate of said beam of electrons with twice the frequency of said alternating current voltage, and means for adjusting the phase of the alternating current voltage applied to each of said grids to ensure that the times of passage of the value of the alternating current voltage applied to any of said grids shall pass through maximum values at the time of sweep of the electron beam thereover.

15. In a time division multiplex system, a commutating electron tube having a cathode and a plurality of beam focusing and deflecting electrodes in the form of arcuate plates arranged concentrically with said cathode, said plates having passages for electrons at equal angular spacings, a grid and an electron collector electrode arranged in succession behind each of said apertures, multiphase transformer means for applying polyphase voltages to said focusing and deflecting electrodes to effect formation of a space scanning electron beam for scanning the said apertures in succession, completing a scan of all said apertures during one cycle of said polyphase voltages, further multi-phase transformer means for applying alternating sine wave voltages to at least certain of said grids, said alternating voltages each having a phase with respect to said polyphase voltages, arranged to provide a maximum voltage value on each grid at the moment of scan of the electron beam across said grid, said alternating voltages having a frequency of one-half the frequency of said polyphase voltages.

16. The combination in accordance with claim 15 and further comprising a single source of signal, and means for deriving therefrom said polyphase voltages and said alternating sine wave voltages.

17. In combination, in a time division multiplex system, means comprising a polyphase transformer for generating an $n$ phased sine wave signal, means for modulating the amplitude of each of the phases of said signal independently, means for sampling the amplitudes of the maximum positive and maximum negative values of each phase of said $n$ phased signal after modulation, and for generating pulses having amplitudes corresponding with the said maximum positive and negative values.

References Cited in the file of this patent

UNITED STATES PATENTS

| Number | Name | Date |
|---|---|---|
| 1,174,793 | Alexanderson | Mar. 7, 1916 |
| 1,928,093 | Coyle | Sept. 26, 1933 |
| 2,217,744 | Skellett | Oct. 15, 1940 |
| 2,333,321 | Leathers | Nov. 2, 1943 |
| 2,433,403 | Skellett | Dec. 20, 1947 |
| 2,444,950 | Nichols | July 13, 1948 |
| 2,448,487 | Field et al. | Aug. 31, 1948 |
| 2,478,919 | Hansell | Aug. 16, 1949 |